Dec. 27, 1955                R. WEISS            2,728,282
INTERCONNECTED FILM WINDING AND SHUTTER TENSIONING
MECHANISM FOR PHOTOGRAPHIC CAMERAS
Filed June 25, 1952
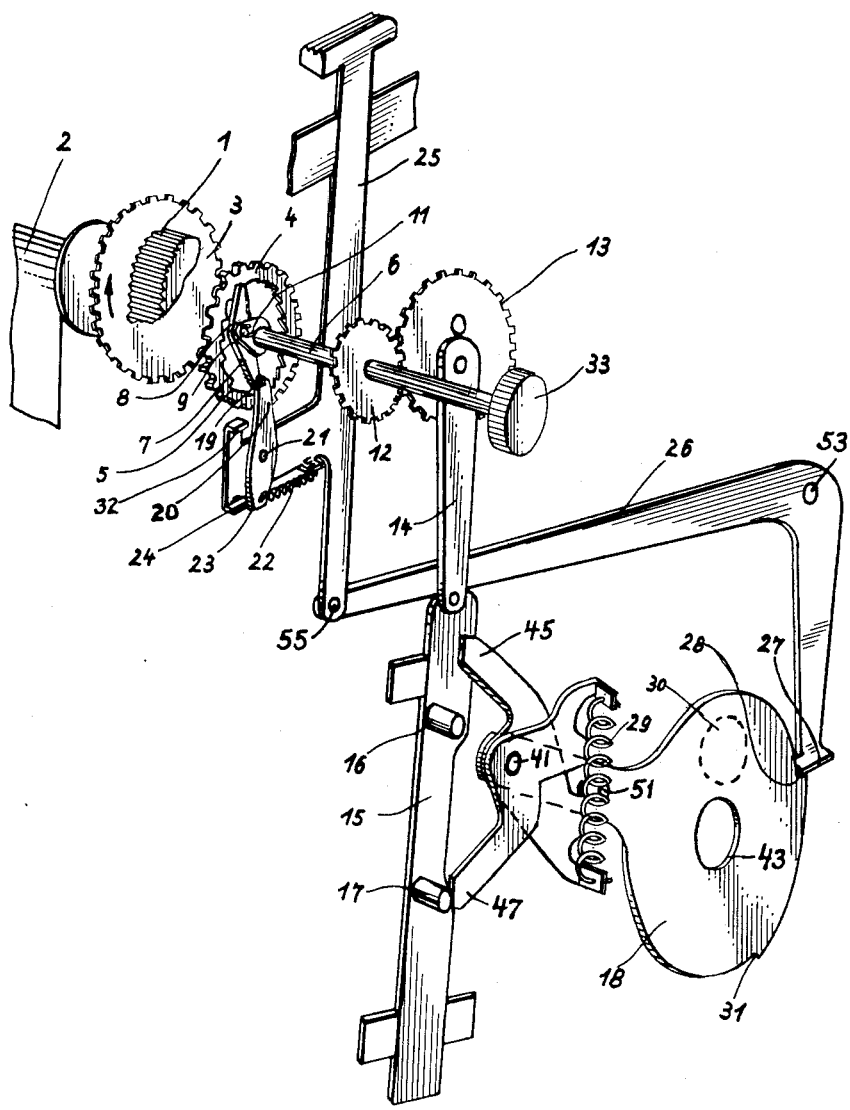
Richard Weiss
*INVENTOR,*
BY Charles Shepard
*ATTORNEY*

United States Patent Office
2,728,282
Patented Dec. 27, 1955

2,728,282
INTERCONNECTED FILM WINDING AND SHUTTER TENSIONING MECHANISM FOR PHOTOGRAPHIC CAMERAS

Richard Weiss, Braunschweig, Germany, assignor to Franke & Heidecke, Fabrik Photographischer Präzisions-Apparate, Braunschweig, Germany Application June 25, 1952, Serial No. 295,501

Claims priority, application Germany June 26, 1951

3 Claims. (Cl. 95—31)

This invention relates to interconnected film winding and shutter tensioning mechanism for photographic cameras. Mechanisms which will tension the shutter of a camera when the film is wound, are known. However, in most of the known mechanisms, the film winding member moves always through a uniform path or to a uniform extent, always being returned to a given starting position at the end of each film winding operation. There are certain types of cameras in which the film winding member does not move always through a uniform extent and is not returned to a given starting position; for instance, it may be desired to connect the film winding knob to the film spool, without any lost motion, with the consequence that near the beginning of winding of the film strip, when the film spool contains few convolutions of film and thus is of less diameter, the film spool must turn through a greater angle to move the film through a distance of one picture area, than near the end of the film strip, when the film spool contains a greater number of convolutions of film and hence is of greater diameter and must be turned through a lesser angle to feed the distance of one picture area.

An object of the present invention is the provision of generally improved and more satisfactory shutter tensioning mechanism for tensioning the shutter each time that the film is wound, regardless of the fact that the film winding parts do not always start from the same position and are not always turned to the same extent or degree.

Another object is the provision of improved mechanism in which the shutter is tensioned during the first part of the movement of the film winding mechanism, and in which the tensioning mechanism is disconnected from the winding mechanism at the completion of the tensioning movement, so that the winding mechanism may continue to move through any desired extent, more or less.

Still another object is the provision of improved interconnected film winding and shutter tensioning mechanism in which the tensioning mechanism is automatically disconnected from the winding mechanism after the latter has moved to a predetermined extent, so that the winding mechanism may then continue to move as much as necessary, and in which the operation of the shutter automatically reconnects the tensioning mechanism to the winding mechanism ready for operation of the tensioning mechanism by the next movement of the winding mechanism.

A further object is the provision of interconnected film winding and shutter tensioning mechanism, so designed that the shutter may easily and quickly be tensioned a second time when desired, without further operation of the winding mechanism, in order that a double exposure may be made on the same picture area, when it is desired to obtain special effects.

These and other desirable objects may be attained in the manner disclosed as an illustrative embodiment of the invention in the following description and in the accompanying drawing forming a part hereof, in which the figure is a diagrammatic or schematic perspective view of parts necessary to understand the present invention.

The drawing illustrates only those parts of a camera which are directly connected with the present invention or otherwise necessary to an understanding of the invention. Conventional camera parts, including the entire camera body and the lens, are omitted, but it will be understood by those skilled in the art that in actual practice the present invention is built into a camera of any suitable construction.

According to the present invention, the film winding knob 1 is connected either directly or through suitable gears, to a film winding spool 2, on which the exposed film is wound up. A shutter is indicated diagrammatically at 18, and a shutter release member externally accessible on the camera body, is indicated at 25. The shutter is a "set" shutter of any known or conventional type or kind, requiring to be set or tensioned after each exposure-making actuation, before it can again be actuated to make the next exposure. Many kinds of such shutters are well known, and the details thereof are not important to the present invention provided the shutter is so constructed that it may be set or tensioned directly or indirectly by a stroke of a reciprocating member. Hence the shutter is not shown here in detail, but is illustrated diagrammatically as comprising a single leaf 18 pivotally mounted at 41 so that when the shutter is operated to swing on its pivot, the aperture 43 of the blade 18 momentarily passes the exposure aperture 30 of the camera body, allowing light momentarily to enter the camera body through the aperture 30, and to fall upon the film which is attached to the winding spool 2. The shutter, in this diagrammatic or schematic showing, has an operating spring 29 the lower and upper ends of which are respectively fastened to setting levers 45 and 47, operated from the film winding mechanism as described below, the mid point of the spring 29 being fastened to the pin 51 on the shutter blade.

As already intimated, the setting levers 45 and 47 of the shutter, according to the present invention, are set or tensioned during the early part of each winding movement of the film feed knob 1, and then are operatively disconnected from the feeding knob so that the feeding knob may continue to turn through a greater or lesser amount, as may be necessary, when the winding spool 2 is of smaller or larger diameter depending on the variable number of convolutions to be wound thereon at the moment. When the shutter is operated to make an exposure, the shutter setting mechanism is automatically reconnected to the film winding knob, so that it will be again set or tensioned upon the commencement of the next film winding operation.

This is accomplished, in the present instance, by providing a spur gear 3, connected with the film winding knob 1, and meshing with the teeth of a gear 4. For simplicity of illustration, the teeth on the gears 3 and 4 extend only part way around these gears in the drawing, but actually the teeth extend around the entire circumference or periphery of each gear.

The gear 4 has in one face a recess provided with internal ratchet teeth 5. The driving shaft 6 of the shutter tensioning mechanism is concentric with the shaft of the gear 4; or, indeed, the gear 4 may be loosely mounted to turn directly on the shaft 6. This shaft 6 has a crank 7 fixed thereto, which crank 7 is pivoted at 9 to a pawl 8 having one end (the upper end when viewed as in the drawing) arranged to engage with the internal ratchet teeth 5, and having its other end (or lower end when viewed as in the drawing) in the form of a tail provided with a laterally extending nose or lug 19 for engagement with the pivoted stop 20. A spring 11 mounted on the crank 7 engages the pawl 8 and tends to turn the pawl counterclockwise on its pivot 9, to hold the upper end of the pawl engaged with the ratchet teeth 5.

The stop 20 is pivoted at 21 to a lateral extension on the shutter release plunger 25, and a spring 22 connected to the lower end 23 of the stop 20 tends to turn this stop on its pivot 21 in a counterclockwise direction until the upper arm of the stop comes into contact with an abutment ear 32 on the plunger 25. In the opposite or clockwise direction, the stop 20 may turn on its pivot 21 (thereby stretching the spring 22) until the lower end 23 engages another abutment ear 24 on the plunger 25. Whenever the shaft 6 and pawl 8 complete one full revolution and come back to the initial or starting position shown in the drawing, the lug 19 on the tail end of the pawl engages the stop 20 and turns the stop until it engages the abutment lug 24, whereupon the stop can turn no further and it then produces enough pressure on the pawl 8 to overcome the spring 11 and disengage the pawl from the ratchet teeth 5.

When the winding knob 1 is rotated clockwise, in the direction of the arrow, to draw a fresh or unexposed picture area into the focal plane of the camera, the corresponding rotation of the gear 3 causes a corresponding counterclockwise rotation of the gear 4. Through the pawl 8, the counterclockwise rotation of the gear 4 causes corresponding counterclockwise rotation of the shaft 6, and of a gear 12 fixed to the shaft 6, which meshes with and causes corresponding rotation in a clockwise direction of the gear 13. As in the case of the gears 3 and 4, the gear teeth on the gears 12 and 13 are illustrated for simplicity as extending only part way around, but actually the gear teeth go around the entire circumference or periphery of these gears.

The gear 13 has a diameter twice as great as the gear 12, so that when the shaft 6 and gear 12 make one complete revolution, the gear 13 will make exactly one-half of a revolution. A connecting link 14 is pivoted at its upper end eccentrically on the gear 13, and pivoted at its lower end to the upper end of a link 15, carrying pins 16 and 17 which cooperate with the tensioning arms 45 and 47 of the shutter 18.

Referring to the specific shutter here illustrated, although emphasizing again that any suitable kind or form of "set" shutter may be used, it is seen that when the shutter blade 18 is in its downward position here illustrated, the pin 51 on the shutter blade engages a shoulder on the lever 45 and holds the upper left end of this lever out of the path of movement of the pin 16, but the lower left end of the other lever 47 will now be in the path of movement of the lever 17. Now if it is assumed that the slide 15 starts at the upper limit of its motion and moves downwardly from this upper limit, it is seen that during such downward movement the pin 16 will clear the tensioning lever 45, but the other pin 17 will engage the other tensioning lever 47 and swing this tensioning lever on the pivot 41, to tension the upper half of the spring 29, the mid point of which is secured to the pin 51. This will tend to move the shutter leaf or blade 18 upwardly or in a counterclockwise direction on its pivot 41. But the shutter cannot move upwardly at this time, because the latching shoulder 28 on the shutter blade is held by the lug 27 on the release lever 26, pivoted at 53 on a fixed fulcrum and also pivoted at 55 to the lower end of the release plunger 25, the upper end of which plunger is accessible externally of the camera body, as above stated.

If, now, the release plunger 25 is depressed, this will turn the release lever 26 on its pivot 53, withdrawing the lug 27 from the shoulder 28, so that the tensioned spring 29 will move the shutter blade upwardly on its pivot 41, causing the shutter aperture 43 to pass momentarily the exposure aperture 30 of the camera, to make an exposure. When the plunger 25 is released, the lug 27 will now catch beneath the other latching shoulder 31 on the shutter blade. This upward swinging movement of the shutter blade will have moved the pin 51 upwardly so that this pin now withdraws the tensioning lever 47 from the path of the pin 17, and permits the other tensioning lever 45 to lie in the path of the tensioning pin 16.

Meanwhile, the downward motion of the release plunger 25, at the time of making the exposure, has withdrawn the stop 20 downwardly below the tail 19 of the pawl 8, so that the spring 11 can once more engage the upper end of the pawl with the ratchet teeth 5. When the release plunger 25 rises once more under the influence of its spring (not shown), the stop 20 will now come up to the left of the tail 19 on the pawl 8, instead of to the right of this tail, because the spring 22 has meanwhile turned the stop 20 in a counterclockwise direction on its pivot 21, to bring it against the abutment 32. So the shaft 6 is now once more connected, through the pawl 8, with the gear 4, and if the winding knob 1 is now turned to remove the exposed picture area from the focal plane of the camera and to draw a fresh unexposed picture area into the focal plane, this will turn the gears 3 and 4 and the shaft 6 and the gears 12 and 13, to draw the connecting link 14 upwardly and likewise to draw the slide 15 upwardly so that the pin 16 thereon now engages the tensioning lever 45 and turns the tensioning lever on its pivot 41 to tension the lower half of the spring 29, making ready for the next exposure movement of the shutter.

At the completion of exactly one full revolution of the shaft 6, the tail lug 19 on the pawl 8 comes against the upper end of the stop 20 and turns this stop on its pivot 21, against the force of the spring 22, until the lower end of the stop 20 engages the lug 24, whereupon it can turn no farther, and it consequently disengages the pawl 8 from the ratchet 5. At this time, since the shaft 6 has turned through exactly one revolution, the gear 13 has turned through exactly one-half a revolution, and the link 14 is now at the upward limit of its motion, in its upper dead center position, with the pin 16 of the slide 15 opposite the end of the lever 45, holding this lever in tensioned position. The shutter is now fully tensioned and ready for an exposure operation, but the shutter tensioning mechanism is disconnected from the film winding mechanism so that the winding knob 1 may continue to turn through part of a revolution or through several revolutions, if necessary, to complete the winding of the film.

Once more the release plunger is depressed to make the next exposure, and this withdraws the ear 27 from the latching shoulder 31 of the shutter blade, allowing the lower tensioned half of the spring 29 to draw the shutter blade downwardly on its pivot 21, to make an exposure. The downward movement of the plunger 25 again withdraws the stop 20 from the tail 19 of the pawl 8, so as to connect the shutter tensioning mechanism once more with the film winding mechanism. So the next operation of the film winding mechanism will again turn the shaft 6 through one complete revolution, thus turning the gear 13 through one-half a revolution, and moving the link 14 and slide 15 from their uppermost positions down to their lowermost positions, so that the pin 17 moves the tensioning lever 47 and tensions the upper half of the shutter spring 29. The parts are now ready for another operation of the shutter. These cycles are repeated over and over again, as often as desired, each operation of the film winding mechanism resulting, during the early part of the operation, in the tensioning of the shutter spring, the shutter tensioning mechanism then being automatically disconnected from the film winding mechanism so that the latter may continue to turn as far as necessary; and each operation of the shutter serving automatically to connect the shutter tensioning mechanism once more to the film winding mechanism.

In case it is desired to operate the shutter two times without an intervening operation of the shutter winding mechanism, as for example when it is desired to make a double exposure to produce special photographic effects, the shaft 6 of the shutter tensioning mechanism is extended to the outside of the camera body and is provided with an accessible knob 33 which may be turned to tension the shutter without operating the film winding mechanism. It will be noted that during this tensioning of the shutter by means of the knob 33, the pawl 8 will ratchet idly over the ratchet teeth 5, and thus will not affect the film winding parts.

In designing the proportions of the various gears, it is only necessary that the gears 3 and 4 be of such relative size that during any possible film feeding operation of one picture length, the gear 4 shall be rotated through at least one complete revolution. A greater extent of rotation of the gear 4 does not matter and, indeed, is to be expected, especially during the winding of the early part of a film strip, when there are less convolutions of the film spool 2 and when consequently, this spool must be turned to a greater extent for the feeding of one picture area.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including a shutter having a tensioning member movable to tension the shutter ready for an exposure and a release member movable to release the tensioned shutter to make an exposure, a film winding member, coupling means for operatively coupling said tensioning member to said winding member to drive the former from the latter, said coupling means including a pawl movable between an ineffective position in which said coupling means is disconnected and an effective position in which said coupling means is operative, a spring tending to move said pawl to effective position, and a stop member mounted on and movable bodily with said release member, said stop member lying in the path of travel of said pawl when said release member is in its normal rest position, to contact with said pawl and shift said pawl to ineffective position at the end of predetermined movement of said film winding member, movement of said release member from normal rest position to shutter releasing position serving to move said stop member out of contact with said pawl so that said spring may move said pawl to effective position to reestablish a driving connection between said film winding member and said shutter tensioning member.

2. A photographic camera including a shutter having a tensioning member movable to tension the shutter ready for an exposure and a release member movable to release the tensioned shutter to make an exposure, a film winding member, means for driving said tensioning member through a complete tensioning movement from the first part of movement of said film winding member and for disconnecting said tensioning member from said winding member upon the completion of said tensioning movement so that said winding member may continue to move without further affecting said tensioning member, said driving means including a ratchet rotatably driven from said winding member, a pawl mounted on said tensioning member for movement between an effective position engaging said ratchet to be driven thereby and an ineffective position disengaged from said ratchet, and a spring tending to move said pawl to its effective position, said means for disconnecting said tensioning member from said winding member including a stop mounted on said release member for engaging said pawl upon completion of a tensioning movement, to shift said pawl to ineffective position against the force of said spring, releasing movement of said release member carrying said stop out of the path of said pawl so that said spring may shift said pawl to effective position for reconnecting said driving means so that the next movement of said winding member will again drive said tensioning member.

3. A construction as defined in claim 2, further including a separate actuating member for said tensioning member, said actuating member being adapted to move said pawl relative to said ratchet to tension the same independently of movement of said winding member.

References Cited in the file of this patent

UNITED STATES PATENTS

| 2,028,752 | Burger | July 28, 1936 |
| 2,304,887 | Crumrine | Dec. 15, 1942 |
| 2,601,817 | Samoggia | July 1, 1952 |

FOREIGN PATENTS

| 120,441 | Germany | May 22, 1901 |
| 569,774 | Germany | Feb. 8, 1933 |
| 624,863 | Germany | Jan. 31, 1936 |
| 246,011 | Switzerland | Aug. 16, 1947 |